United States Patent
Bergner et al.

(10) Patent No.: US 9,836,824 B2
(45) Date of Patent: Dec. 5, 2017

(54) DE-NOISED RECONSTRUCTED IMAGE DATA EDGE IMPROVEMENT

(71) Applicant: PHILIPS GMBH, Hamburg (DE)

(72) Inventors: Frank Bergner, Hamburg (DE); Kevin Martin Brown, Chardon, OH (US); Stanislav Zabic, Lyndhurst, OH (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 161 days.

(21) Appl. No.: 14/785,038

(22) PCT Filed: Apr. 4, 2014

(86) PCT No.: PCT/IB2014/060414
§ 371 (c)(1),
(2) Date: Oct. 16, 2015

(87) PCT Pub. No.: WO2014/177953
PCT Pub. Date: Nov. 6, 2014

(65) Prior Publication Data
US 2016/0071245 A1 Mar. 10, 2016

Related U.S. Application Data

(60) Provisional application No. 61/816,846, filed on Apr. 29, 2013, provisional application No. 61/897,374, filed on Oct. 30, 2013.

(51) Int. Cl.
*G06K 9/00* (2006.01)
*G06T 5/00* (2006.01)
(Continued)

(52) U.S. Cl.
CPC ............ *G06T 5/002* (2013.01); *G06T 7/0012* (2013.01); *G06T 7/13* (2017.01); *G06T 11/003* (2013.01);
(Continued)

(58) Field of Classification Search
None
See application file for complete search history.

(56) References Cited

U.S. PATENT DOCUMENTS 4,794,531 A 12/1988 Morishita et al.
6,373,992 B1 4/2002 Nagao
(Continued)

FOREIGN PATENT DOCUMENTS

CN 102521800 A 6/2012
WO 2009081410 A2 7/2009

OTHER PUBLICATIONS

Ali, S. A., et al.; An Efficient Denoising Technique for CT Images using Window-based Multi-Wavelet Transformation and Thresholding; 2010; European Journal of Scientific Research; 48(2)315-325.
(Continued)

*Primary Examiner* — Atiba O Fitzpatrick

(57) ABSTRACT

A system includes obtaining de-noised reconstructed image data and edge improving a sub-set of the de-noised reconstructed image data corresponding to edges of structure represented in the de-noise reconstructed image data. A system (100) includes an edge detector (202) that detects an edge map of edge locations within de-noised reconstructed image data, a noise image data generator (204) that generates noise image data by subtracting the reconstructed image data by the de-noised reconstructed image data, a noisy edge image data generator (206) that generates noisy edge image data by multiplying the noise image data and the edge map, and an edge improver (208) that generates edge improved de-noised image data by adding the noisy edge image data and a product of a weight and the de-noised reconstructed image data.

18 Claims, 4 Drawing Sheets

Figure 1:
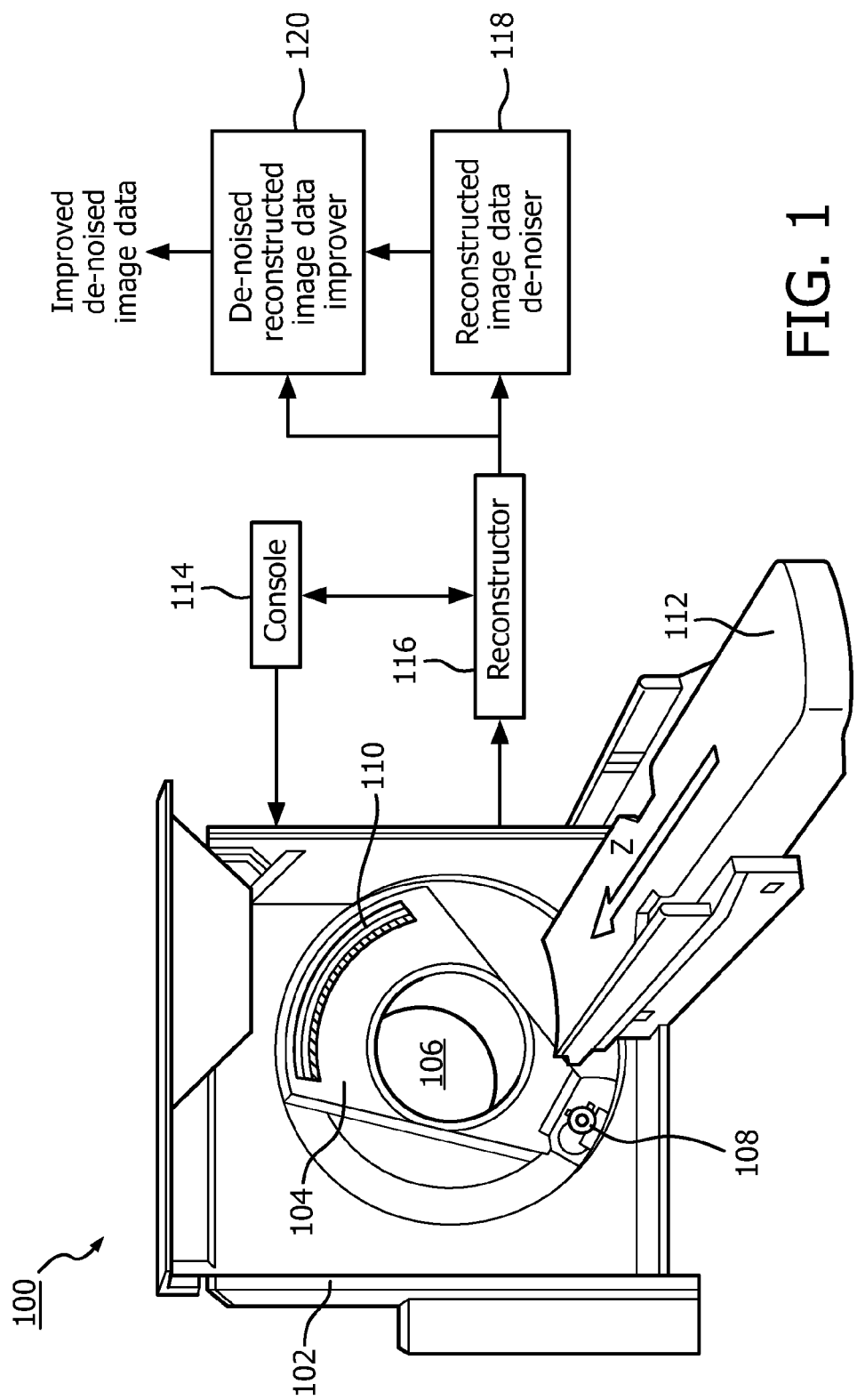

(51) Int. Cl.
　　　*G06T 7/00*　　　(2017.01)
　　　*G06T 11/00*　　(2006.01)
　　　*G06T 7/13*　　　(2017.01)

(52) U.S. Cl.
　　　CPC .............. *G06T 2207/10072* (2013.01); *G06T 2207/20192* (2013.01); *G06T 2207/30004* (2013.01); *G06T 2211/421* (2013.01)

(56) References Cited

U.S. PATENT DOCUMENTS

| | | | |
|---|---|---|---|
| 7,983,511 | B1 | 7/2011 | Chan |
| 8,938,110 | B2 | 1/2015 | Goshen et al. |
| 2011/0268328 | A1* | 11/2011 | Bar-Aviv .................. G06T 5/50 382/128 |
| 2012/0106815 | A1 | 5/2012 | Yang et al. |
| 2014/0314331 | A1 | 10/2014 | Zabic et al. |

OTHER PUBLICATIONS

Bruder, H., et al.; 4D Iterative Reconstruction in Cardiac CT for Noise & Dose Reduction at Maintained Temporal Resolution; 2010; 1st Int'l. Conf. on Image Formation in X-Ray Computed Tomography; pp. 268-271.

Brunet, D., et al.; The Use of Residuals in Image Denoising; 2009; ICIAR LNCS; 5627; pp. 1-12.

Canny, J.; A Computational Approach to Edge Detection; 1986; IEEE Trans. on Pattern Analysis and Machine Intelligence; vol. PAMI-8, No. 6; 679-698.

Erdogan, H., et al.; Monotonic Algorithms for Transmission Tomography; 1999; IEEE Trans. on Medical Imaging; 18 (9)801-814.

Fessler, J. A.; Statistical Image Reconstruction Methods for Transmission Tomography; 2000; SPIE Handbook of Medical Imaging; vol. 2; Medical Image Processing & Analysis; pp. 1-70.

Koehler, T., et al.; A New Method for Metal Artifact Reduction in CT; 2012; 2nd Int'l Conf. in Image Formation in X-Ray Computed Tomography; pp. 1-4.

Koehler, T., et al.; Noise Properties of Maximum Likelihood Reconstruction with Edge-Preserving Regularization in Transmission Tomography; 2009; Fully 3D; pp. 1-4.

Kyriakou, Y., et al.; Empirical Beam Hardening Correction (EBHC) for CT; 2010; Med. Phys.; 37:5179.

Roerdink, J. B. T. M., et al.; The Watershed Transform: Definition, Algorithms and Parallelization Strategies; 2001; Fundamenta Informaticae; 41:187-228.

Shi, D., et al.; Weighted Simultaneous Algebraic Reconstruction Technique; 2011; Fully 3D; pp. 157-159.

Thibault, J-B., et al.; A three-dimensional statistical approach to improved image quality for multislice helical CT; 2007; Med. Phys.; 34(11)4526-4544.

Yang, Z., et al.; Adaptive Weighted Anisotropic Diffusion for Computed Tomography Denoising; 2011; Fully 3D; pp. 207-210.

Yu, Z., et al.; Fast Model-Based X-Ray CT Reconstruction Using Spatially Nonhomogeneous ICD Optimization; 2011; IEEE Trans. on Image Processing; 20(1)161-175.

Barbero, Alvaro et al "Fast Newton-Type Methods for Total Variation Regularization", Proceedings of the 28th International Conf. on Machine Learning, 2011.

* cited by examiner

DE-NOISED RECONSTRUCTED IMAGE DATA EDGE IMPROVEMENT

CROSS REFERENCE TO RELATED APPLICATIONS

This application is a national filing of PCT application Serial No. PCT/IB2014/060414, filed Apr. 4, 2014, published as WO 2014/177953 A1 on Nov. 6, 2014, which claims the benefit of U.S. provisional application Ser. No. 61/816,846 filed Apr. 29, 2013 and U.S. provisional application Ser. No. 61/897,374 filed Oct. 30, 2013, which are incorporated herein by reference.

The following generally relates to de-noising reconstructed image data and more particularly to improving edges of structure in de-noised reconstructed image data, and is described with particular application to computed tomography (CT). However, the following is also amenable to other modalities such as digital X-ray, hybrid/combined positron emission tomography (PET)/CT hybrid/combined magnetic resonance imaging (MM)/CT, and/or other modality.

Iterative reconstruction (IR) algorithms may improve image quality over filtered backprojection (FBP) algorithms. The image quality improvement is largely centered on the attempt to produce images that have less noise and fewer image artifacts than those produced by FBP. This can be used to either lower the dose delivered to the patient, improve the clarity of the images without changing the dose, or some combination of both lower dose and improved image quality.

Iterative reconstruction algorithms such as the maximum likelihood approach simultaneously minimize both the roughness of the images and the dissimilarity between the reconstructed image volume and the data. Without the roughness penalty, iterative reconstructions tend to be extremely noisy, even noisier than FBP reconstructions with an apodization.

There are also image domain based de-noising algorithms, which attempt to improve the image quality by taking the noise out of the images without going back to the projection space. Because they remain in image space, these algorithms are much faster than the iterative reconstruction approaches, but they do not necessarily provide results identical to those of the full iterative reconstructions algorithms.

With both iterative reconstruction and image domain de-noising algorithms, noise may remain at the edges of imaged structure, especially when so-called "edge-preserving" penalty functions are used, while the noise in the nearby flat regions is removed or greatly reduced. This may cause the structure to appear to have a rough or "jagged" edge, when in reality the edge of the structure may be quite smooth (such as an elliptical cross-section of a cylinder). An example of such a structure in the body would be the aorta.

Unfortunately, if a radiologist sees structure which appears to have a jagged edge, when they know in fact that the underlying edge is smooth, then they begin to doubt the accuracy or reliability of other structures in the image. In some cases, rough organ boundaries can be an indication of disease. In such a case, if an organ edge appears incorrectly rough or jagged, it could lead to a misdiagnosis.

Aspects described herein address the above-referenced problems and others.

The following describes an approach to improve the appearance of edges of structure in de-noised reconstructed image data. As described in greater detail below, this includes adding a (weighted or non-weighted) negative of the noise removed from the reconstructed image data back to the edges or a region around the edges.

In one aspect, a method includes obtaining de-noised reconstructed image data and edge improving a sub-set of the de-noised reconstructed image data corresponding to edges of structure represented in the de-noise reconstructed image data.

In another aspect, a system includes an edge detector that detects an edge map of edge locations within de-noised reconstructed image data, which is de-noised reconstructed image data, a noise image data generator that generates noise image data by subtracting the reconstructed image data by the de-noised reconstructed image data, a noisy edge image data generator that generates noisy edge image data by multiplying the noise image data and the edge map, and an edge improver that generates edge improved de-noised image data by adding the noisy edge image data and a product of a weight and the de-noised reconstructed image data.

In another aspect, a computer readable storage medium is encoded with computer readable instructions. The computer readable instructions, when executed by a processer, causes the processor to: obtain reconstructed image data, obtain de-noised reconstructed image data, wherein the de-noised reconstructed image data is a de-noised version of the obtained reconstructed image data, generate an edge map of edge locations within the de-noised reconstructed image data by applying an edge detection algorithm to the de-noised reconstructed image data, generate noise image data by subtracting the reconstructed image data by the de-noised reconstructed image data, generate noisy edge image data by multiplying the noise image data and the edge map, and generate edge improved de-noised image data by adding the noisy edge image data and a product of a weight and the de-noised reconstructed image data.

The invention may take form in various components and arrangements of components, and in various steps and arrangements of steps. The drawings are only for purposes of illustrating the preferred embodiments and are not to be construed as limiting the invention.

FIG. 1 schematically illustrates a de-noised reconstructed image data improver in connection with a reconstructed image data de-noiser and an imaging system, which generates reconstructed image data.

Figure 2:
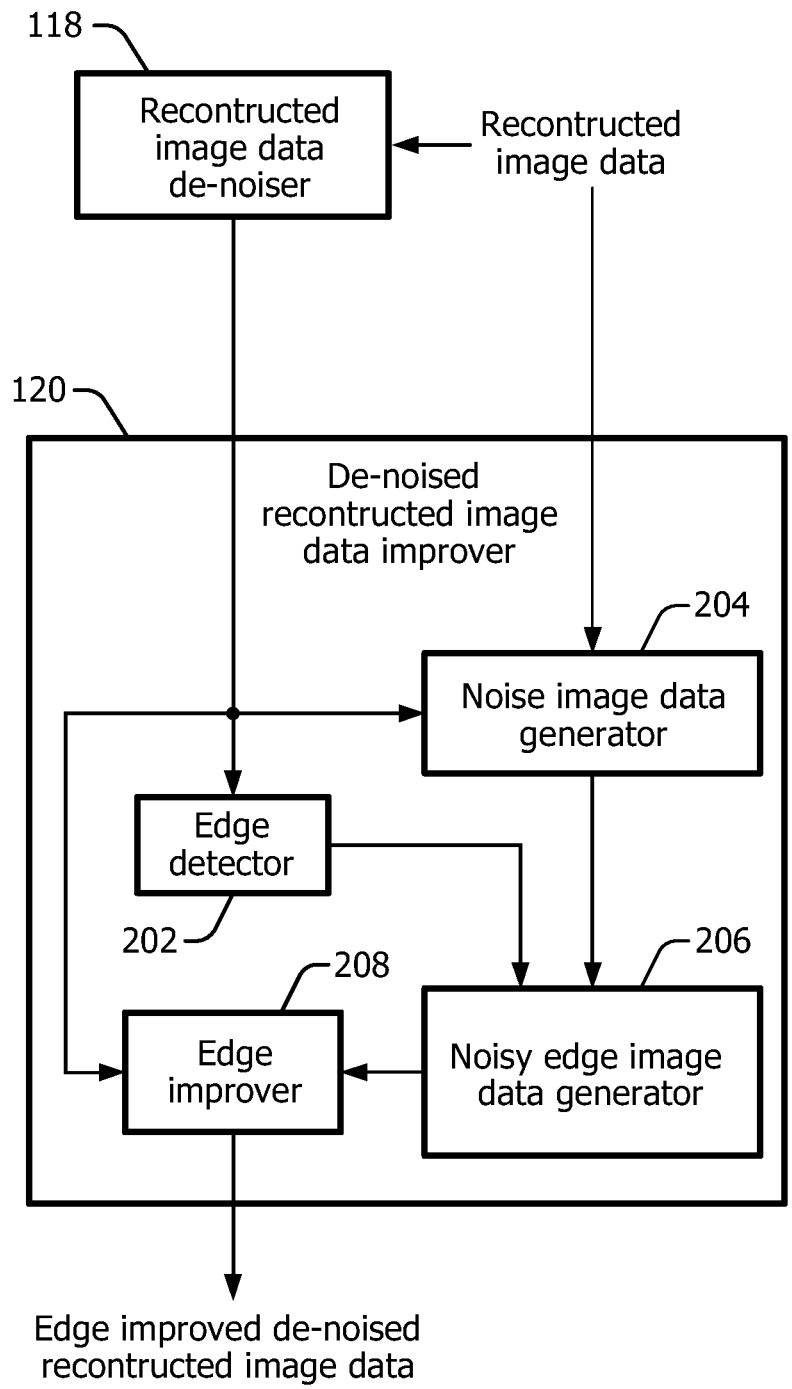

FIG. 2 illustrates a non-limiting example of the de-noised reconstructed image data improver with an edge improver.

Figure 3:
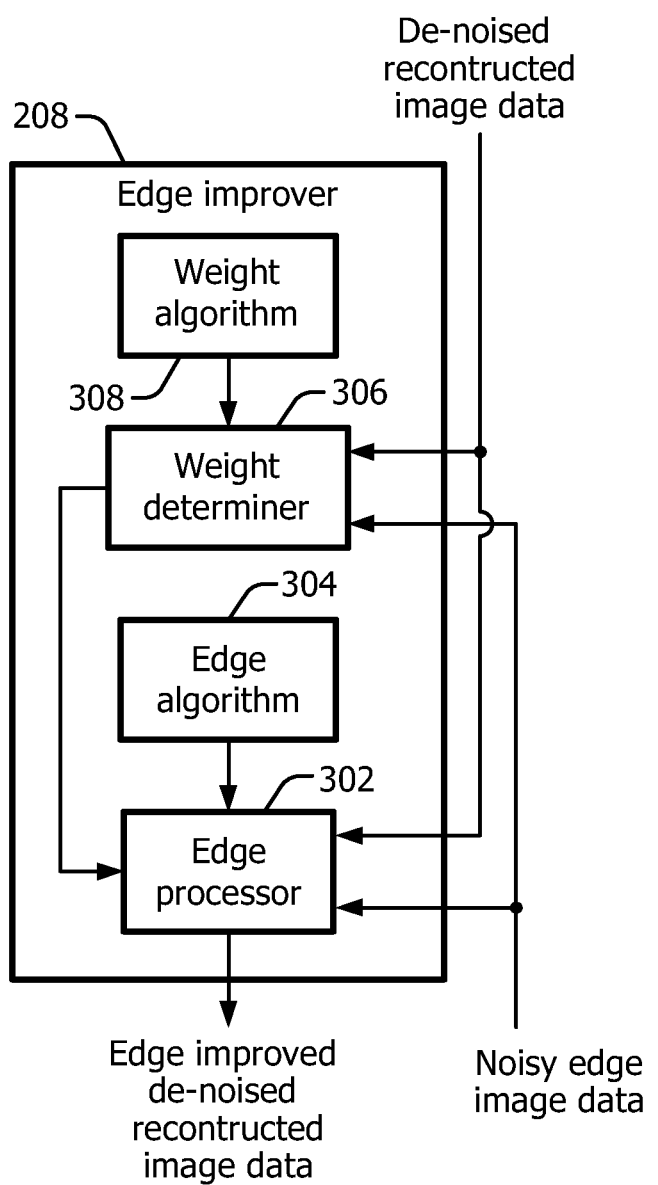

FIG. 3 schematically illustrates an example of the edge improver of FIG. 2.

Figure 4:
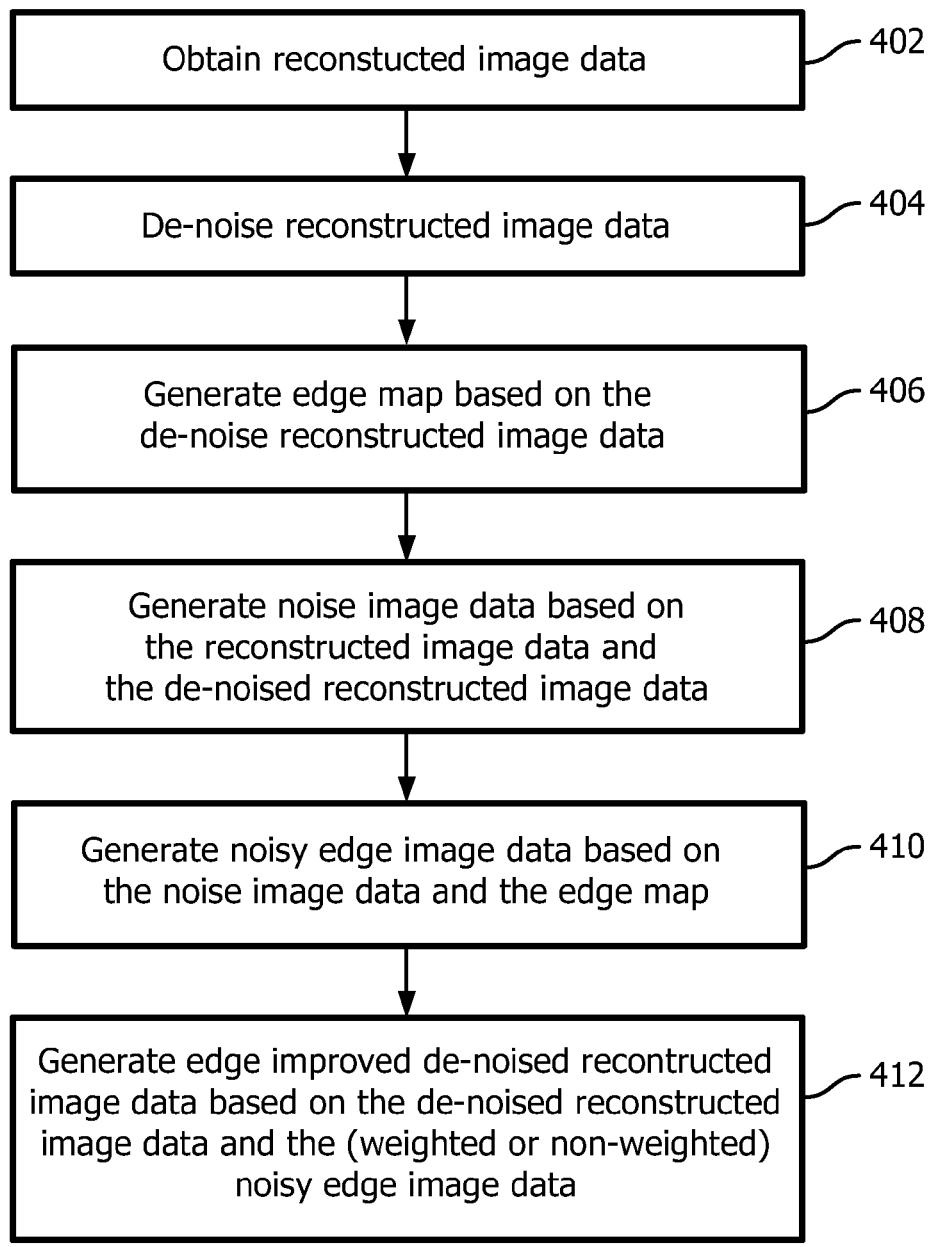

FIG. 4 illustrates an example method for edge improving structure of de-noised reconstructed image data.

The following describes an approach to improve the appearance of edges of structure in de-noised reconstructed image data. Generally, the approach applies noise cancellation to selective regions of the de-noised reconstructed image data. The approach is well-suited for aggressive de-noising algorithms, but can also be used with less aggressive de-noising algorithms.

FIG. 1 illustrates an imaging system 100 such as a computed tomography (CT) scanner. The imaging system 100 includes a generally stationary gantry 102 and a rotating gantry 104. The rotating gantry 104 is rotatably supported by the stationary gantry 102 and rotates around an examination region 106 about a longitudinal or z-axis.

A radiation source 108, such as an x-ray tube, is rotatably supported by the rotating gantry 104. The radiation source 108 rotates with the rotating gantry 104 and emits radiation that traverses the examination region 106. A source collimator includes collimation members that collimate the radiation to form a generally cone, fan, wedge or otherwise shaped radiation beam.

A one or two-dimensional radiation sensitive detector array 110 subtends an angular arc opposite the radiation source 108 across the examination region 106. The detector array 110 includes a plurality of rows of detectors that extend along the z-axis direction. The detector array 110 detects radiation traversing the examination region 106 and generates projection data indicative thereof.

A patient support 112, such as a couch, supports an object or subject such as a human patient in the examination region 106. The support 112 is configured to move the object or subject for loading, scanning, and/or unloading the object or subject. A general-purpose computing system or computer serves as an operator console 114. The console 114 allows an operator to control operation of the system 100.

A reconstructor 116 reconstructs the projection data and generates reconstructed volumetric image data indicative thereof. The reconstructor 116 may employ a conventional filtered-backprojection reconstruction, a cone beam algorithm, an iterative algorithm and/or other algorithm. Furthermore, the reconstructor 116 may be utilized to generate images with higher, lower and/or other resolutions.

A reconstructed image data de-noiser 118 de-noises the reconstructed image data generated by the reconstructor 116 (and/or by another reconstructor), generating de-noised reconstructed image data. The reconstructed image data can be obtained from the reconstructor 116 and/or by another reconstructor, and/or a data repository such as a picture archiving and communication system (PACS), a radiology information system (RIS), a hospital information system (HIS), and/or other data repository.

Suitable de-noising algorithms include, but are not limited to those described in application Ser. No. 13/508,751, filed on May 9, 2012, and entitled "Enhanced Image Data/Dose Reduction," and application Ser. No. 61/563,078, filed on Nov. 23, 2011, and entitled "Image Data De-Noising," which are incorporated by reference in their entirety herein, or any other de-noising algorithm.

A de-noised reconstructed image data improver 120 visually improves the de-noised reconstructed image data. As disclosed in greater detail below, in one instance, this includes adding back, in the negative, a sub-portion of the noise removed by the de-noising of the reconstructed image data de-noiser 118. Where the sub-portion includes edges of structure (e.g., tissue boundaries) in the reconstructed image data, the resulting de-noised image data includes edges which, relative to the image data before the improvement, are smoother. The de-noised reconstructed image data improver 120 can also provide other image improvement(s).

The reconstructed image data de-noiser 118 and/or the de-noised reconstructed image data improver 120 can be part of a computing system(s) that includes a microprocessor(s), which executes a computer readable instruction(s) encoded on computer readable storage medium such as physical memory and other non-transitory medium to carry out a function(s) described herein. Alternatively, the reconstructed image data de-noiser 118 and/or the de-noised reconstructed image data improver 120 (or a sub-portion thereof) can be part of the console 114. Additionally or alternatively, the microprocessor(s) can execute a computer readable instruction(s) carried by a carrier wave signal and other transitory medium to carry out a function(s) described herein.

FIG. 2 schematically illustrates an example of the de-noised reconstructed image data improver 120.

An edge detector 202 applies an edge detection algorithm to the de-noised reconstructed image data and generates an edge map (or image), which includes edge locations of structure in the de-noised reconstructed image data. Examples of suitable edge detection algorithms include, but are not limited to a gradient magnitude, a Canny, a watershed transform, a combination thereof and/or an adaption thereof, and/or other edge detection algorithms.

An example of the Canny algorithm is discussed in Canny, "A Computational Approach To Edge Detection", IEEE Trans. Pattern Analysis and Machine Intelligence, 8(6):679-698, 1986. With this algorithm, the edge map includes a value of one where an edge is located and a value of zero elsewhere. An example of the watershed transform algorithm is discussed in Roerdink et al., "The watershed transform: definitions, algorithms, and parallelization strategies," In Fundamenta Informaticae 41 (2000), pp. 187-228.

With the gradient magnitude algorithm, the edge map includes values that fall off or decrease from a non-zero value, where an edge is located, to a value of zero, within a predetermined range or window about the edge. The values can fall off linearly, non-linearly, exponentially, step-wise, and/or otherwise. Other edge detection algorithms are also contemplated herein.

A noise image data generator 204 generates noise image data based on the de-noised reconstructed image data and the reconstructed image data. In one instance, the noise image generator 204 generates the noise image by subtracting the de-noised reconstructed image data from the reconstructed image data.

A noisy edge image data generator 206 generates noisy edge image data based on the noise image data and the edge map. In one instance, the noisy edge image data generator 204 generates the noisy edge image data by multiplying the noise image data with the edge map. Where a gradient edge detection algorithm is used, the resulting noisy edge image data includes image data where noise remains only within the window defined by the gradient magnitude algorithm.

Where the Canny edge detection algorithm is used, the resulting noisy edge image data includes image data where noise only remains on the edges. Alternately, morphological image processing operations such as dilation can be applied to the edge map, prior to the multiplication. Furthermore, the noise image data can be smoothed with a linear filter prior to the multiplication with the edge map.

An edge improver 208 generates the edge improved de-noised image data based on the de-noised reconstructed image data and the noisy edge image data. In one instance, the edge improver 208 generates the edge improved de-noised image data by subtracting the noisy edge image data to the de-noised reconstructed image data. Such an approach may be considered as noise cancellation.

The subtraction can be weighted or non-weighted. The weight can be variously determined. For example, in one instance, the weight is based on data acquisition and/or reconstruction parameters. Examples of such parameters include an estimated noise of the projection and/or image data, slice width, reconstruction filter, voxel size, and/or parameter. In another instance, the weight is independent of data acquisition and/or reconstruction parameters.

Turning to FIG. 3, a non-limiting example of the edge improver 208 is schematically illustrated. The edge improver 208 includes an edge processor 302 that processes the reconstructed de-noised image data and the noisy edge image data based on edgy algorithm 304. A non-limiting example of the edge algorithm 304 is a weighed summation as shown in EQUATION 1:

$$\text{image}_{final} = \text{image}_{denoised} + w \cdot \text{image}_{noisyedge}, \quad \text{EQUATION 1:}$$

where image$_{final}$ represents the edge improved de-noised image data, image$_{denoised}$ represents the de-noised reconstructed image data, image$_{noisyedge}$ represents the noisy edge image data, and w represents a weight, which can be between negative one (1) and zero (0), or otherwise.

The edge improver 208 also includes a weight determiner 306, which determines the weight w based on the reconstructed de-noised image data, the noisy edge image data, and a weight algorithm 308. An example of a suitable edge algorithm 308 is an algorithm based on an image quality metric such as smoothness. In one instance, the edge algorithm 308 optimizes a cost function to mitigate over or under compensation, which, respectively, may introduce other artifact or not correct the edge artifact enough. In this example, the optimization is a minimization of the cost functions, which is optimized either iteratively or analytically, depending on the smoothness criterion.

The smoothness criterion, for example, can be a total variation, a squared difference of neighboring pixel, and/or other approach. One suitable approach is described in Koehler et al., "A New Method for Metal Artifact Reduction in CT," Proceedings of the CT Meeting 2012, Salt Lake City, pp. 29-32, 2012. This approach includes adding a correction image using a correct factor locally determined by a brute force search in each image voxel. Another suitable smoothness approach is based on total variation criterion, for example, using approximations and is faster than the approach of Koehler et al.

An example total variation approach is described next. Using $\mu_0$ to represent image$_{denoised}$ and $\mu_{cor}$ to image$_{noisyedge}$, the total variation TV($\mu$) of an image $\mu$ can be given in the discrete form as shown in EQUATION 2:

$$TV(\mu) = \Sigma_i \Sigma_j \sqrt{(\mu_{i,j} + \mu_{i+1,j})^2 + (\mu_{i,j} - \mu_{i,j+1})^2}, \quad \text{EQUATION 2:}$$

where $\mu_{i,j}$ are the pixel at the location (i,j). An example cost function is shown in $$L(\beta) = TV(\mu_0 + \beta \mu_{cor}) = \Sigma_i \Sigma_j \sqrt{a_{i,j} \beta^2 + b_{i,j} \beta + c_{i,j}}, \quad \text{EQUATION 3:}$$

where $\beta$ represents w and a, b, and c are voxel specific constants of a quadratic function, which can be derived by expanding the squares of EQUATION 2 and combining the terms with the same $\beta$ in the polynomial. For example, the constants a, b, and c can be determined as: $a_{i,j} = (\mu_{0,i,j} - \mu_{0,i+1,j})^2 + (\mu_{0,i,j} - \mu_{0,i,j+1})^2$, $b_{i,j} = 2(\mu_{0,i,j} - \mu_{0,i+1,j})(\mu_{cor,i,j} - \mu_{cor,i+1,j}) + 2(\mu_{0,i,j} - \mu_{0,i,j+1})(\mu_{cor,i,j} - \mu_{cor,i,j+1})$, and $c_{i,j} = (\mu_{cor,i,j} - \mu_{cor,i+1,j})^2 + (\mu_{cor,i,j} - \mu_{cor,i,j+1})^2$.

The cost function of EQUATION 3 can be approximated using a first order Taylor approximation of the square root. Ignoring the constant factors, a cost function at the expansion point $\beta_n$ is shown in EQUATIONS 4 and 5:

$$\tilde{L}(\beta_n, \beta) = \Sigma_i \Sigma_j \frac{1}{\sqrt{a_{i,j} \beta_n^2 + b_{i,j} \beta_n + c_{i,j}}} (a_{i,j} \beta^2 + b_{i,j} \beta), \quad \text{EQUATION 4}$$

$$\tilde{L}(\beta_n, \beta) = \Sigma_i \Sigma_j d_{i,j}(\beta_n) \beta^2 + e_{i,j}(\beta_n) \beta, \quad \text{EQUATION 5:}$$

where $$d_{i,j}(\beta_n) = \frac{a_{i,j}}{\sqrt{a_{i,j} \beta_n^2 + b_{i,j} \beta_n + c_{i,j}}} \text{ and}$$

$$e_{i,j}(\beta_n) = \frac{b_{i,j}}{\sqrt{a_{i,j} \beta_n^2 + b_{i,j} \beta_n + c_{i,j}}}.$$

A final value of $\beta$ can be derived as shown in EQUATION 6:

$$\beta_{n+1} = \beta_n = 0.5 \frac{\sum_i \sum_j e_{i,j}(\beta_n) \beta}{\sum_i \sum_j d_{i,j}(\beta_n) \beta}. \quad \text{EQUATION 6}$$

where n represents the current iteration. The final value of $\beta$ will depend on the noise in the original de-noised reconstructed image data and will be the $\beta$ that minimizes the total variation.

With EQUATION 5, a starting value of $\beta_0$ of an incorrect order of magnitude will cancel out in the update term when $\beta_0$ is large enough as the square-root factors are part of the numerators as well as the denominators. As such, $\beta$ will already be close to the correct order of magnitude after the first iteration. The number of iterations can be based on a predetermined number of iterations, a predetermined time limit, and/or a predetermined error threshold between successive iterations. For the latter, the current $\beta$ is compared with the previous $\beta$ with the difference being compared with the threshold. The update terminates when the different is equal to or less than the threshold.

Although FIG. 3 is described in connection with the CT imaging system 100 of FIG. 1 and the reconstructed image data de-noiser 118 and the de-noised reconstructed image data improver 120 of FIGS. 1 and 2, it is to be appreciated that the edge improver 208 of FIG. 3 can be utilized with other imaging systems, other reconstructed image data de-noisers, and/or other de-noised reconstructed image data improvers.

Generally, the edge improver 208 of FIG. 3 can be utilized with any imaging system (e.g., x-ray tomography, magnetic resonance (MR), positron emission tomography (PET), etc.) which acquires projections or views of data which are subsequently reconstructed to generate an image or image data. Furthermore, the edge improver 208 of FIG. 3 can process reconstructed imaged data that is de-noised using other de-noising approaches and/or noisy edge image data generated using other noisy edge image data generating approaches.

In FIGS. 2 and 3, the edge improver 208 receives and processes the de-noised reconstructed image data. It is to be appreciated that the edge improver 208 can process all of the pixels in a single image or all of the pixels in a set of two more images. Alternatively, only one or more sub-sets of the pixels in the single image or the set of two more images are processed. The sub-set of the pixels and/or the set of the images can be predetermined and/or user defined.

Moreover, the value of $\beta$ can optionally be user-defined and/or user-adjustable. For the former, the user can enter a value via a graphical user interface and/or command line prompt. Alternatively, a user-defined value can be stored in electronic format in a file and accessed by the edge improver 208. Alternatively, the user can employ a control invoked through a touchscreen interface and/or mechanical/physical button to enter and/or adjust the value of β.

FIG. 4 illustrates an example method for edge improving de-noised reconstructed image data.

It is to be appreciated that the ordering of the acts in the methods is not limiting. As such, other orderings are contemplated herein. In addition, one or more acts may be omitted and/or one or more additional acts may be included.

At 402, reconstructed image data is obtained. As disclosed herein, the reconstructed image data can be generated by the imaging system 100 and/or other system, and can be obtained by the imaging system and/or a data repository.

At 404, the reconstructed image data is de-noised, generating de-noised reconstructed image data. As described herein, various de-noising algorithms can be used, including, but not limited to, an algorithm described in application Ser. No. 13/508,751 and/or other de-noising algorithm.

At 406, an edge map (or image) of edge locations within the de-noised reconstructed image data is generated. As described herein, in one non-limiting instance this includes applying an edge detection algorithm to the de-noised reconstructed image data. Also described herein, the edge map can include values decreasing from a non-zero value to zero (0) within a predetermined range or window about an edge, values that are one (1) at the edges and zero (0) otherwise, or other values.

At 408, noise image data is generated based on the reconstructed image data and the de-noised reconstructed image data. As described herein, in one non-limiting instance this includes subtracting on the reconstructed image data by the de-noised reconstructed image data.

At 410, noisy edge image data is generated based on the noise image data and the edge map. As described herein, in one non-limiting instance this include by multiplying the noise image data and the edge map.

At 412, edge improved de-noised image data is generated based on the de-noised reconstructed image data and the noisy edge image data. As described herein, in one non-limiting instance this includes adding the (weighted or non-weighted) noisy edge image data and the de-noised reconstructed image data.

The above methods may be implemented by way of computer readable instructions, encoded or embedded on computer readable storage medium, which, when executed by a computer processor(s), cause the processor(s) to carry out the described acts. Additionally or alternatively, at least one of the computer readable instructions is carried by a signal, carrier wave or other transitory medium.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

The invention claimed is:

1. A method, comprising:
    obtaining de-noised reconstructed tomographic image data;
    generating noisy edge image data by multiplying noise image data and an edge map, wherein the noise image data represents noise removed from reconstructed tomographic image data used to generate the de-noised reconstructed tomographic image data;
    weighting the noisy edge image data with a predetermined weight by multiplying the noisy edge image data by the weight; and
    adding the weighted noisy edge image data to the de-noised reconstructed tomographic image data, which edge improves a sub-set of the de-noised reconstructed tomographic image data corresponding to edges of structure represented in the de-noised reconstructed tomographic image data.

2. The method of claim 1, wherein the edges are improved through noise cancellation.

3. The method of claim 1, further comprising:
    adding a negative of the noise image data to the de-noised reconstructed tomographic image data, wherein the noise image data is generated by subtracting the de-noised reconstructed tomographic image data from the reconstructed tomographic image data.

4. The method of claim 1, wherein the weight has a value between zero and one.

5. The method of claim 1, further comprising:
    determining the weight based on a smoothness criterion.

6. The method of claim 5, wherein the smoothness criterion is one of a total variation of an image or a squared difference of neighboring pixels of an image.

7. The method of claim 6, further comprising:
    determining the weight by minimizing a cost function, which is the smoothness criterion applied on the sum of the de-noised reconstructed tomographic image data and the weighted noisy edge image data.

8. The method of claim 1, further comprising:
    generating the edge map by applying an edge detection algorithm to the de-noised reconstructed tomographic image data.

9. The method of claim 8, wherein the edge detection algorithm includes one or more of a weighted gradient magnitude, Canny or a watershed transform.

10. The method of claim 1, wherein at least one of the edge map represents edge locations within the de-noised reconstructed tomographic image or the edge locations are located through values decreasing from a value of one to a value of zero within a predetermined window about an edge and zeroes everywhere else.

11. The method of claim 10, wherein the edge locations are located through values of one at the edges and zeroes everywhere else.

12. The method of claim 1, further comprising, at least one of:
    dilating the edge map prior to the multiplication, smoothing the noise image data with a filter prior to the multiplication, or generating the noise image data by subtracting the de-noised reconstructed tomographic image data from the noisy reconstructed tomographic image data.

13. A system, comprising:
    an edge detector, implemented by a processor, that detects an edge map of edge locations within de-noised reconstructed tomographic image data;
    a noise image data generator, implemented by the processor, that generates noise image data by subtracting the reconstructed tomographic image data by the de-noised reconstructed tomographic image data;
    a noisy edge image data generator, implemented by the processor, that generates noisy edge image data by multiplying the noise image data and the edge map; and
    an edge improver, implemented by the processor, that generates edge improved de-noised image data by adding the noisy edge image data and a product of a weight and the de-noised reconstructed tomographic image data.

14. The system of claim 13, wherein the edge improver cancels noise from the edges of structure in the de-noised reconstructed tomographic image data.

15. The system of claim 13, wherein the weight is a value between negative one and zero.

16. The system of claim 13, wherein the edge map represents one of edge locations within the de-noised reconstructed tomographic image using values decreasing from a value of one to a value of zero within a predetermined window about each edge and zeroes everywhere else or edge locations within the de-noised reconstructed tomographic image using a value of one at each edge and zeroes everywhere else.

17. The system of claim 13, the edge improver, comprising:
  a weight determiner, implemented by the processor, that determines the weight based on a smoothness criterion, which includes one of a total variation of an image or a squared difference of neighboring pixels of an image, by minimizing a cost function of the smoothness criterion being applied on the sum of the de-noised reconstructed tomographic image data and the weighted noisy edge image data.

18. A computer readable storage medium encoded with one or more computer executable instructions, which, when executed by a processor of a computing system, causes the processor to:
  obtain reconstructed tomographic image data;
  obtain de-noised reconstructed tomographic image data, wherein the de-noised reconstructed tomographic image data is a de-noised version of the obtained reconstructed tomographic image data;
  generate an edge map of edge locations within the de-noised reconstructed tomographic image data by applying an edge detection algorithm to the de-noised reconstructed tomographic image data;
  generate noise image data by subtracting the reconstructed tomographic image data by the de-noised reconstructed tomographic image data;
  generate noisy edge image data by multiplying the noise image data and the edge map; and
  generate edge improved de-noised image data by adding the noisy edge image data and a product of a weight and the de-noised reconstructed tomographic image data.

* * * * *